United States Patent [19]

Wyder

[11] Patent Number: 4,475,697
[45] Date of Patent: Oct. 9, 1984

[54] INERTIA REEL USING MODULAR LOCKING MECHANISM

[75] Inventor: Manfred Wyder, Rowland Heights, Calif.

[73] Assignee: American Safety Equipment Corporation, Troy, Mich.

[21] Appl. No.: 474,712

[22] Filed: Mar. 11, 1983

[51] Int. Cl.³ .................. A62B 35/02; B65H 75/48
[52] U.S. Cl. .............................................. 242/107.4 A
[58] Field of Search ............... 242/107.4 A; 280/806; 297/478, 480

[56] References Cited

U.S. PATENT DOCUMENTS

| | | | |
|---|---|---|---|
| 3,578,260 | 5/1971 | Kell | 242/107.4 A |
| 3,834,646 | 9/1974 | Heath | 242/107.4 A |
| 3,871,599 | 3/1975 | Takada | 242/107.4 A |
| 3,918,658 | 11/1975 | Beller | 242/107.4 A |
| 4,018,400 | 4/1977 | Henderson | 242/107.4 A |
| 4,040,576 | 8/1977 | Walker et al. | 242/107.4 A |
| 4,059,242 | 11/1977 | Tanaka | 242/107.4 A |
| 4,162,773 | 7/1979 | Wallin | 242/107.4 A |
| 4,355,772 | 10/1982 | Adomeit | 242/107.4 A |

Primary Examiner—John M. Jillions
Attorney, Agent, or Firm—Poms, Smith, Lande & Rose

[57] ABSTRACT

An emergency locking safety belt retractor having a modular locking pawl actuator subassembly for transferring the rotational movement of a webbing storage reel of the retractor to a locking pawl to move the locking pawl from a deactivated to an activated position in engagement with a locking ratchet to prevent further webbing protractive rotation of the reel. The actuator subassembly includes a shiftable housing containing a vehicle inertia sensor which activates a program pawl to engage a program ratchet which transfers the rotation of the storage reel to the subassembly housing and in turn to the locking pawl to lock the reel in response to an emergency condition.

3 Claims, 5 Drawing Figures

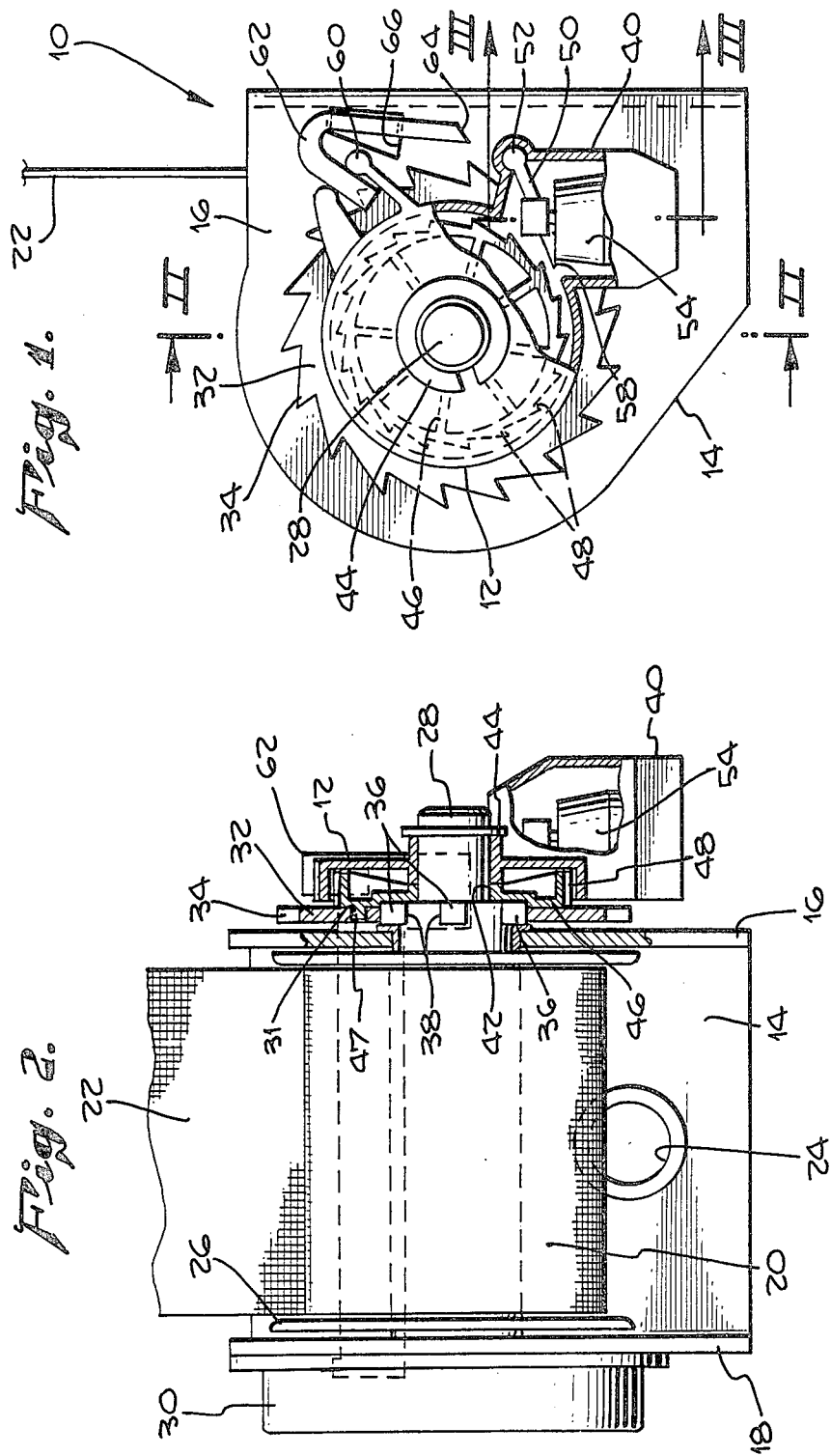

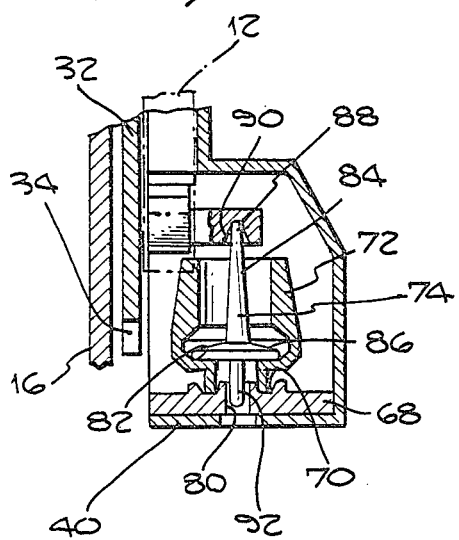
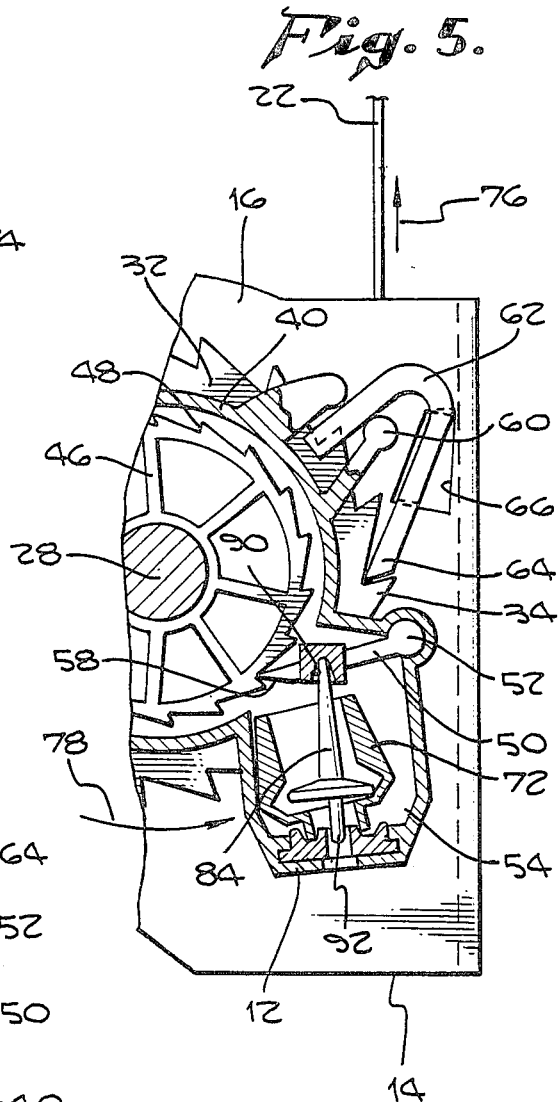
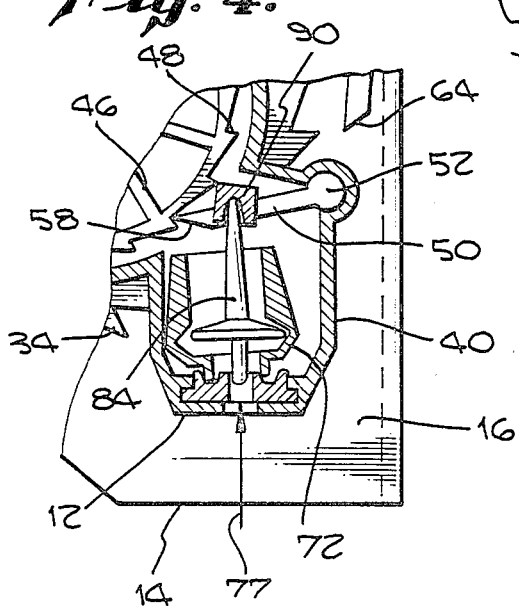

INERTIA REEL USING MODULAR LOCKING MECHANISM

FIELD OF THE INVENTION

The present invention relates to emergency locking safety belt retractors; and, more particularly, to an improved emergency locking retractor having a modular locking actuator subassembly.

BACKGROUND OF THE INVENTION

Safety belt retractors which utilize energy derived from a rotating shaft for moving a lock pawl into engagement with a ratchet wheel mounted on webbing storage reel are known in the art; such as the inertia reel mechanisms described in U.S. Pat. No. 3,578,260 to Kell and U.S. Pat. No. 4,059,242 to Tanaka. In these prior art devices, safety belt retractors are provided with a locking pawl and a first ratchet engageable by the locking pawl for locking a belt storage reel against unwinding movement and an actuating pawl which is moved into engagement with a subsidiary ratchet wheel during an emergency situation such that rotation of the storage reel imparted by protractive force exerted upon a safety belt webbing will cause the engaged actuating pawl to operate the locking pawl to prevent further rotation of the belt storage reel.

Such prior art retractors generally contain a number of external moving parts and consequently require a multiplicity of steps to assemble. As a result, such prior art retractors are relatively expensive to manufacture. Further, the multiplicity of parts involved makes such retractors relatively complex in operation.

SUMMARY OF THE INVENTION

Accordingly, it is a principal object of the present invention to provide an improved emergency locking safety belt retractor with emergency sensing lockup provisions. It is a further object of the present invention to provide a safety belt retractor that utilizes a minimum of external moving parts.

It is still a further object of the present invention to provide a safety belt retractor which is simple and inexpensive to manufacture and assemble.

It is an additional object of the present invention to provide a safety belt retractor in which the locking actuator assembly is environmentally protected.

These and other objects are preferably accomplished by providing a safety belt retractor having a modular locking pawl actuator subassembly for transferring the rotational movement of the webbing storage reel of the retractor to a locking pawl to move the locking pawl from a deactivated to an activated, locking position in which the belt webbing storage reel is prevented from further webbing protractive rotation. The improvements include a movable subassembly housing which serves to both transfer the rotation of the storage reel to the locking pawl in response to an emergency situation and to protect and support the associated locking pawl actuator program components of the locking retractor.

BRIEF DESCRIPTION OF THE DRAWINGS

FIG. 1 is a partially cutaway side view of an exemplary embodiment of an emergency locking safety belt retractor mechanism employing the improvement of a vehicle inertia responsive modular locking pawl actuator subassembly.

FIG. 2 is a partially cutaway front view of the safety belt retractor of FIG. 1 taken in section along the plane II—II of FIG. 1.

FIG. 3 is a front sectional view of a portion of the safety belt retractor of FIG. 1 taken along plane III—III of FIG. 1.

FIG. 4 is a sectional side view of a portion of the safety belt retractor of FIG. 2 illustrating the response of the program means of the present invention to an emergency situation.

FIG. 5 is a cutaway side view of a portion of the safety belt retractor of FIG. 1 showing the modular locking pawl actuator subassembly of the present invention as it shifts to a locking pawl activated position in response to an emergency situation.

DETAILED DESCRIPTION OF A PREFERRED EXEMPLARY EMBODIMENT

As will now be described in detail, FIGS. 1 and 2 show an exemplary embodiment of an emergency locking retractor, generally indicated by reference 10, employing the improved modular locking pawl actuator subassembly 12 of the present invention. As will be discussed in detail below, the modular locking subassembly 12 is constructed to rotate to a limited degree relative to retractor 10 in response to vehicle acceleration or deceleration and thereby activate a locking pawl to lock retractor 10 against further protractive rotation.

Retractor 10 comprises a support frame 14 having side plates 16 and 18 supporting a reel assembly 20 about which safety belt webbing 22 is wound for protraction and retraction. Support frame 14 is adapted for mounting to a vehicle at a convenient location such as a doorpost or vehicle frame member (not shown). Mounting hole 24 is provided in support frame 14 to enable retractor 10 to be securely attached by fasteners, such as bolts or screws (not shown), to the vehicle doorpost or other suitable location on the vehicle such that retractor 10 will remain firmly attached to the vehicle during an emergency situation.

Reel assembly 20 is composed of a spool 26 about which webbing 22 is wound for protraction and retraction. Spool 26 in turn is rotatively mounted on shaft 28 which extends through side plate 16. As commonly practiced in the art, it is contemplated that a rewind spring (not shown) be provided within end cap 30 of retractor 10 so that reel assembly 20 will normally be biased to retract webbing 22, in the absence of a protractive force being exerted upon the webbing, through clockwise rotation of spool 26. Thus, webbing 22 will normally be wound around spool 26 for storage purposes. Webbing 22 is extracted in order to secure a passenger within the vehicle by applying protractive force sufficient to overcome the rewind spring biasing. Such protractive force will impart a counterclockwise rotation, as seen by the viewer in FIG. 1, to spool 26. As will be discussed in detail below, this counterclockwise rotation of spool 26 in response to protractive force applied to webbing 22 is utilized to shift the modular locking pawl actuator subassembly 12 from a locking pawl deactivated position to a locking pawl activated position. A locking ratchet wheel 32 having multiple teeth 34 is securely and fixedly attached to reel assembly 20 by dogs 36 which engage corresponding slots 38 provided in spool 26. This method for attaching ratchet wheel 32 to reel assembly 20 is preferred due to its strength and because it simplifies the manufacture and assembly of the emergency locking retractor and modular subassembly of the present invention by providing a slide on method of assembly and attachment.

The modular locking subassembly 12 comprises a shiftable housing 40 that is rotatively mounted upon the extending end of shaft 28 by journal surface 42. Circlip 44 is provided for maintaining the position of housing 40 upon shaft 28. Contained within housing 40 are program means for shifting housing 40 from the locking pawl deactivated position to the locking pawl activated position in response to vehicle acceleration or deceleration in excess of a predetermined amount likely to be encountered in an emergency situation. In the present invention it is preferred that the program means comprise a program ratchet wheel 46 having multiple teeth 48 and engagement pegs 47 (one of which is visible) for fixedly engaging corresponding holes 31 in locking ratchet wheel 32, a program pawl 50 which is movably mounted on pivot 52 which in turn is fixedly attached to housing 40, and a vehicle inertia sensor 54. Program pawl 50 is provided with an engaging surface 58 for engaging teeth 48 of program ratchet wheel 46. In addition, housing 40 is provided with an actuator member 60 for engaging a locking pawl 62. Locking pawl 62 is provided with an engaging surface 64 for engaging the multiple teeth 34 of locking ratchet wheel 32. Locking pawl 62 is pivotally connected to support frame 14 by retainer 66 which serves to securely attach pawl 62 to frame 14. As will be described in detail with reference to FIGS. 4 and 5, program pawl 50, when activated to engage wheel 46, serves to transfer the rotation of program ratchet wheel 46, imparted to wheel 46 by spool 26 via locking ratchet wheel 32, all being fixedly attached to one another by their respective engagement pegs and dogs, to housing 40 to shift subassembly 12 to the locking pawl activated position.

FIG. 3 shows a preferred vehicle inertia sensor 54. Sensor 54 comprises a pendulum support 68 which is provided with an annular groove 70 for receiving the base of a hollow cylindrical inertia sensing pendulum mass 72. Mass 72 is provided with a vertical axial bore 74 extending completely therethrough and communicating with an aperture 80 in support 68. Pendulum mass 72 is provided with an interior actuator camming surface 82 formed by an annular recess in the interior surface of mass 72.

An actuator shaft 84 is disposed within axial bore 74. In the exemplary embodiment, shaft 84 is provided with a thrust flange 86 which rests upon camming surface 82 in a force transmitting relationship. The tip 88 of shaft 84 extends beyond the top of mass 72 and engages a socket 90 provided in locking pawl 50. Additionally, actuator shaft 84 is provided with an alignment pin 92 extending through aperture 80 of support 68, thereby aligning shaft 84 within axial bore 74 of pendulum mass 72 on support 68.

During normal vehicle operation, pendulum mass 72 is supported in a generally perpendicular attitude within annular groove 70 of support 68 and thrust flange 86 of shaft 84 rests upon camming surface 82. Changes in vehicle inertia associated with emergency conditions displace mass 72 away from a generally perpendicular attitude forcing camming surface 82 upwardly against thrust flange 86, thereby causing actuator shaft 84 to be moved vertically. This vertical movement is communicated by tip 88 of shaft 84 to socket 90 of program pawl 50, lifting pawl 50 into engagement with program ratchet wheel 46. For a further detailed discussion of the operation of inertia sensor 54, reference is made to U.S. Pat. No. 4,018,400 (Henderson).

As shown by FIGS. 1 and 2, the locking mechanism of the present invention is a self-contained subassembly. This configuration is preferred because it provides for simplified manufacturing and assembly techniques. In addition, because the vehicle inertia sensor and program components are enclosed within housing 40, they are environmentally protected. To facilitate this simplified method of manufacture and assembly, it is preferred that program ratchet wheel 46 be provided with pegs 47 for engaging corresponding holes 31 in locking ratchet wheel 32. Thus, the fully assembled locking subassembly 12 is easily attached to reel assembly 20 by sliding journal surface 42 of locking subassembly 12 over the extending end of shaft 28 and thereby engaging pegs 47 of program ratchet wheel 46 in holes 31 of locking ratchet wheel 32. Then, circlip 44 is positioned about shaft 28 to lock subassembly 12 in position on shaft 28.

In operation, as shown in FIGS. 4 and 5, the modular locking subassembly of the present invention shifts from a deactivated to an activated locking position in the following manner. Changes in vehicle acceleration or deceleration in excess of a preselected level will cause pendulum mass 72 of vehicle inertia sensor 54 to be displaced, as discussed above, forcing actuator shaft 84 upward, as shown by arrow 77, lifting program pawl 50. Pawl 50 moves about pivot 52 to a position where engaging surface 58 makes contact with one of multiple teeth 48 on program ratchet wheel 46. Locking mechanism 12 is now programed to respond to protractive extension of webbing 22 to activate locking pawl 62 and thus to lock reel assembly 20 against further protractive motion. Then, as protractive force is exerted upon webbing 22, as shown by arrow 76, a slight counterclockwise rotation is imparted to reel assembly 20. This rotational motion is translated by dogs 36 through locking ratchet wheel 46 and is simultaneously translated by program pawl 50, previously lifted into engagement with program ratchet wheel 46 by sensor 54, as described above, through pivot 52 to housing 40, causing housing 40 to pivot on journal surface 42 about the extending end of shaft 28 as indicated by curved arrow 78, forcing actuator member 60 to pivot locking pawl 62 about retainer 66 into a position where engaging surface 64 of locking pawl 62 engages one of multiple teeth 34 in locking ratchet wheel 32. Because locking pawl 62 is securely attached to frame 14 by retainer 66, this engagement serves to effectively lock ratchet wheel 32 and thereby lock reel assembly 20 against further rotation. In this manner, further protraction of webbing 22 is prevented during an emergency condition. It will be appreciated that program ratchet wheel 46 is precisely aligned with locking ratchet wheel 32 in the proper orientation to prevent a tip to tip condition from occurring between the multiple teeth 34 of wheel 32 and the engagement surface 64 of locking pawl 62; thereby assuring positive and secure locking of retractor 10.

When the emergency situation has subsided, the protractive force exerted upon webbing 22 will be relaxed allowing a slight clockwise rotation of reel assembly 20 (biased to rewind in a clockwise direction as described above) which disengages the engagement surfaces of locking pawl 62 and program pawl 50 from the teeth of their respective ratchet wheels. Once so disengaged, subassembly 12 is free to shift back to the deactivated position under the influence of gravity or some other form of biasing. As a result, webbing 22 can be freely unwound from spool 26 through exertion of protractive force by the occupant.

Because of the forces involved, it is preferred that locking pawl 62 and locking ratchet 32 be constructed of load bearing materials, such as metal. Whereas, the program ratchet and program pawl may be constructed of lighter materials, such as resilient plastics because of the need for responsive action. Additionally, actuator member 60 is preferably constructed of a flexible material to allow for limited overtravel of housing 40 to prevent overstressing the locking subassembly 12.

Having thus described an exemplary embodiment of the present invention, it should now be apparent to those skilled in the art that the various features, objects, and advantages of the present invention have been attained and, that various modifications, adaptations and equivalent constructions may be made in view thereof which still fall within the scope and spirit of the present invention. For example, other forms of vehicle inertia sensor may be utilized in place of the pendulum mass type sensor disclosed or a locking bar may be substituted for the locking pawl disclosed. Accordingly, the scope of the present invention is defined and limited only by the following claims.

What is claimed is:

1. An emergency locking safety belt retractor having a webbing storage reel, a locking ratchet turnable with said reel and engaged by a locking pawl to prevent webbing protraction relative said reel, a programming ratchet turnable with said reel, a programming pawl engageable with said programming ratchet and vehicle inertia sensor means for actuating said programming pawl into engagement with said programming ratchet in the event of an emergency condition to cause lock up of said locking pawl and locking ratchet in a programmed manner wherein the improvement comprises the provision of:

housing means for housing said programming ratchet and for mounting said programming pawl for pivotal movement relative said programming ratchet;

means for mounting said housing means on said retractor for shifting movement relative an initial pre-emergency condition position;

a flexible actuator member operable between said housing means and said locking pawl to move said locking pawl into engagement with said locking ratchet on shifting movement of said housing means to a locking pawl activated position; and said housing means, said programming pawl and said programming ratchet being mounted on said retractor so as to maintain said programming pawl in engagement with said programming ratchet after actuation by said sensor means, through shifting movement of said housing means to said locking pawl activated position, under urging of said programming ratchet applied to said programming pawl during webbing protractive movement of said reel prior to engagement of said locking ratchet by said locking pawl, and until said locking pawl is released from said locking ratchet by a webbing winding rotation of said reel sufficient to return said housing means to said initial pre-emergency condition position whereby said locking pawl and programming pawl each remain in locking relation to said locking ratchet and programming ratchet, respectively, until released by said webbing rewind rotation of said reel to thereby avoid premature unlocking of said reel following occurrence of an emergency condition sensed by said vehicle inertia sensor means.

2. An emergency locking safety belt retractor having a webbing storage reel, a locking ratchet turnable with said reel and engaged by a locking pawl to prevent webbing protraction relative said reel, a programming ratchet turnable with said reel, a programming pawl engageable with said programming ratchet and vehicle inertia sensor means for actuating said programming pawl into engagement with said programming ratchet in the event of an emergency condition to cause lock up of said locking pawl and locking ratchet in a programmed manner wherein the improvement comprises the provision of:

means for mounting programming pawl, programming ratchet and vehicle inertia sensor means together in a preassembled subassembly for mounting of such subassembly to said retractor and means for mounting said subassembly to said retractor with said programming ratchet engaged with and driven by rotational movement of said reel.

3. An emergency locking safety belt retractor having a webbing storage reel, a locking ratchet turnable with said reel and engaged by a locking pawl to prevent webbing protraction relative said reel, a programming ratchet turnable with said reel, a programming pawl engageable with said programming ratchet and vehicle inertia sensor means for actuating said programming pawl into engagement with said programming ratchet in the event of an emergency condition to cause lock up of said locking pawl and locking ratchet in a programming manner wherein the improvement comprises said programming pawl and vehicle inertia sensor means being mounted in a housing which in turn is shiftably mounted relative said programming ratchet and wherein said housing has a chamber enclosing said programming ratchet whereby said programming ratchet, programming pawl and vehicle inertia sensor means are protected by said housing from exterior contaminates.

* * * * *